No. 787,219. PATENTED APR. 11, 1905.
J. R. PRING.
WHIFFLETREE COUPLING.
APPLICATION FILED AUG. 17, 1904.
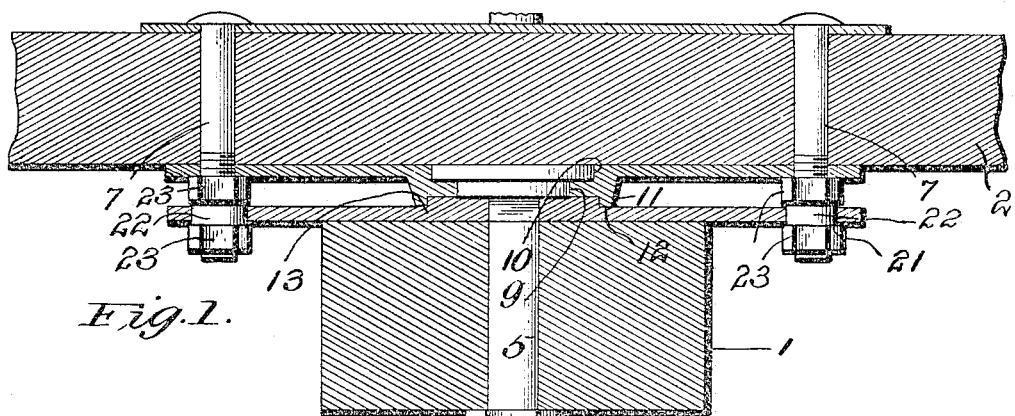
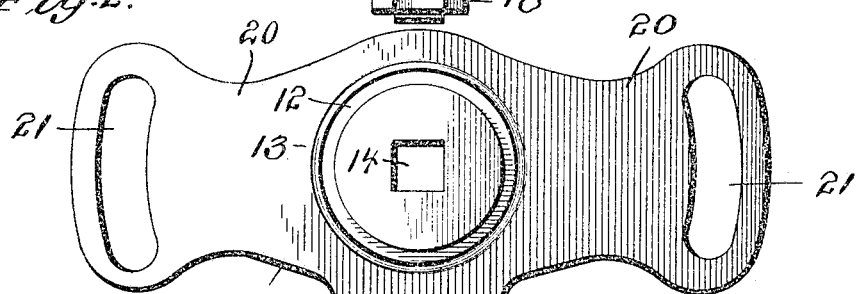
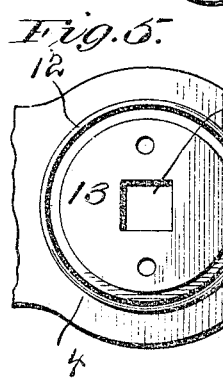
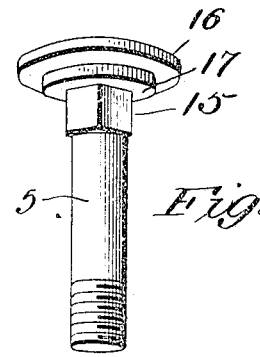
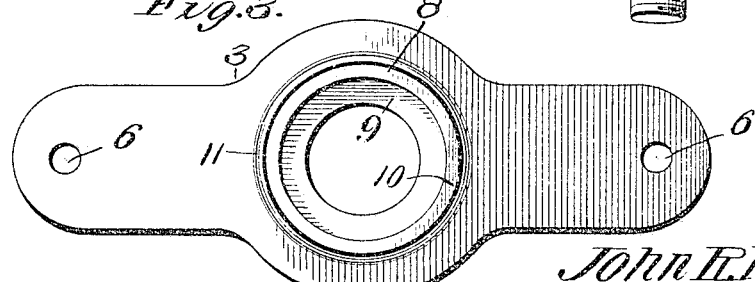
Witnesses
Inventor
John R. Pring
By Rexford M. Smith
Attorney No. 787,219. Patented April 11, 1905.

UNITED STATES PATENT OFFICE.

JOHN R. PRING, OF SHAWNEE, OKLAHOMA TERRITORY, ASSIGNOR OF FORTY-NINE ONE-HUNDREDTHS TO STANLEY H. BURT, OF TOLEDO, OHIO.

WHIFFLETREE-COUPLING.

SPECIFICATION forming part of Letters Patent No. 787,219, dated April 11, 1905.

Application filed August 17, 1904. Serial No. 221,053.

*To all whom it may concern:*

Be it known that I, JOHN R. PRING, a citizen of the United States of America, residing at Shawnee, in the county of Pottawatomie, Territory of Oklahoma, have invented a certain new and useful Whiffletree-Coupling, of which the following is a specification, reference being had therein to the accompanying drawings.

This invention relates to whiffletree-couplings of that type which are designed to provide a pivotal coupling connection between swingletrees and doubletrees, between a doubletree and a pole, or between a swingletree and a cross-bar of a pair of thills. In this connection the invention contemplates a coupling of this character capable of general application as a pivotal coupling in any relation in which it may be useful, although possessing special utility as a coupling for doubletrees and swingletrees in their ordinary uses.

To this end the invention has in view an improved form of coupling providing a wide pivotal bearing for the members, while at the same time securing exceptional strength and durability. Furthermore, the construction of the coupling is of such a nature as to admit of its application to the parts to be coupled without the necessity of perforating the tree to receive a coupling pin or bolt, thus preserving the full strength of the tree, while at the same time permitting of the usual pivotal action thereof.

Another object of the invention is to provide a snug and compact arrangement of the parts constituting the pivot so that the same may be thoroughly dust and weather proof, and in its adaptation to poles for coupling a doubletree thereto the invention possesses special utility in providing means for limiting the play of the doubletree and at the same time dispensing with the usual stay-straps ordinarily employed for that purpose.

With these and other objects in view, the nature of which will more fully appear as the description proceeds, the invention consists in the novel construction, combination, and arrangement of parts, as herein fully illustrated, described, and claimed.

In the accompanying drawings, Figure 1 is a sectional view of the contiguous portion of a wagon-pole and doubletree, showing the improved coupling applied thereto. Fig. 2 is a plan view of the lower or base member of the coupling, which is fitted to the pole. Fig. 3 is a plan view of the upper or crown member, which is fitted to the tree. Fig. 4 is a detail perspective view of the special form of coupling pin or bolt preferably employed as a part of the coupling. Fig. 5 is a detail plan view of the plain form of the lower or base member for ordinary purposes in connecting up a swingletree to a doubletree.

Like reference-numerals designate corresponding parts in all figures of the drawings.

In carrying out the invention no change is required in the members to be coupled, and as the invention possesses special utility as a coupling for connecting a doubletree to a pole the same will be described particularly with reference to that application, although it will be understood that the functions of the pivoting parts remain the same irrespective of the members to be coupled.

Referring particularly to Fig. 1 of the drawings, the numeral 1 designates an ordinary wagon-pole, with which is associated in the usual relation an ordinary doubletree 2, and to provide for pivotally connecting the parts together the improved coupling contemplated by the present invention may be employed. This coupling as an entirety is interposed between the tree and the pole, as shown in Fig. 1, and essentially consists of three principal parts, to wit: the upper and lower plate members 3 and 4 and a special form of coupling pin or bolt 5. These parts when in assembled relation constitute the complete coupling. The upper member 3 of the coupling may be properly termed a "pivotal crown-plate" of an elongated or oblong form and adapted to receive through the perforations 6 at the ends thereof fastening-bolts 7, which are passed through the tree 2. The central portion of the upper plate member 3 is formed with a circular bearing-cup 8, having a central circular bearing-opening 9 therein, and at the upper side of this bearing-opening the body of the plate 3 is formed with a circular seat 10 of greater diameter than the opening 9. The recess of the bearing-cup 8 is surrounded by a guarding-lip 11, registering in the annular rabbet 12, formed by the side edge of a bearing-boss 13, arising from the lower plate member 4. This plate member 4 is also provided in the center thereof with a squared pin-holding opening 14, receiving the squared neck portion 15 of the coupling-pin 5. The said neck portion 15 is surmounted by a circular pin or bolt head 16 and a journal-collar 17 of a less diameter than the head 16 and immediately adjoining the squared portion 15. The said journal-collar 17 fits in the central bearing-opening 9 of the upper plate and clamps upon the upper side of the boss 13. The pin is held clamped in this position through the medium of a binding-nut 18, mounted on the threaded lower end thereof and impinging against the under side of the pole 1. The head 16 of the coupling-pin registers flush with the circular seat 10 at the upper side of the upper plate.

In the adaptation of the coupling to a pole the lower or base member 4 is preferably provided with a longitudinally-disposed securing-tongue extension 19, securely bolted or otherwise rigidly fastened to the pole, and in addition to the tongue extension is also formed with oppositely-projecting ear members 20. These ear members are formed in their outer ends with the arcuate guiding-slots 21, receiving the roller-sleeves 22, mounted on extensions of the fastening-bolt 7 between retaining-nuts 23, placed on said bolt extensions. From this construction it will be obvious that the doubletree is permitted its usual play with reference to the pole; but this play is restricted by the extent of play of the bolt extensions in the guiding-slots 21. Thus provision is made for dispensing with the usual stay-straps.

The form of base-plate shown in Fig. 5 is employed between the doubletree and swingletree, there being no central tongue extension required. The edges of the arcuate slots may also be reinforced or thickened, as shown in Fig. 5, to provide for increased wearing qualities.

Having thus described the invention, what is claimed as new is—

1. A whiffletree-coupling comprising a lower member having an upstanding rabbeted bearing-boss formed with a squared pin-opening, an upper plate member provided with a bearing-cup registering with said boss and having a central bearing-opening, said member being also formed in its upper side with a circular seat, and a coupling-pin provided with a circular head registering in said seat, a journal-collar beneath the head and registering in the bearing-opening, and a squared neck portion engaging a squared pin-opening in the lower member.

2. In a coupling of the class described, the combination with the pole and tree, of the upper and lower plate members having a pivotal connection, and fastening-bolts connecting the upper member to the tree and provided with extensions having a limited guiding engagement with the lower plate member.

3. In a coupling of the class described, the combination with a pole and tree, of the upper and lower plate members having a pivotal connection, the lower plate member being provided with ears having guiding-slots therein, and fastening-bolts securing the upper members to the tree and carrying upon their lower ends rollers working in said guiding-slots.

In testimony whereof I affix my signature in presence of two witnesses.

JOHN R. PRING.

Witnesses:
T. C. SANDERS,
A. T. GRAYSON.